Oct. 20, 1959  E. L. WOOD  2,909,390
TIRE TRIM-WHEEL TRIM STRUCTURE
Filed May 23, 1956  3 Sheets-Sheet 2

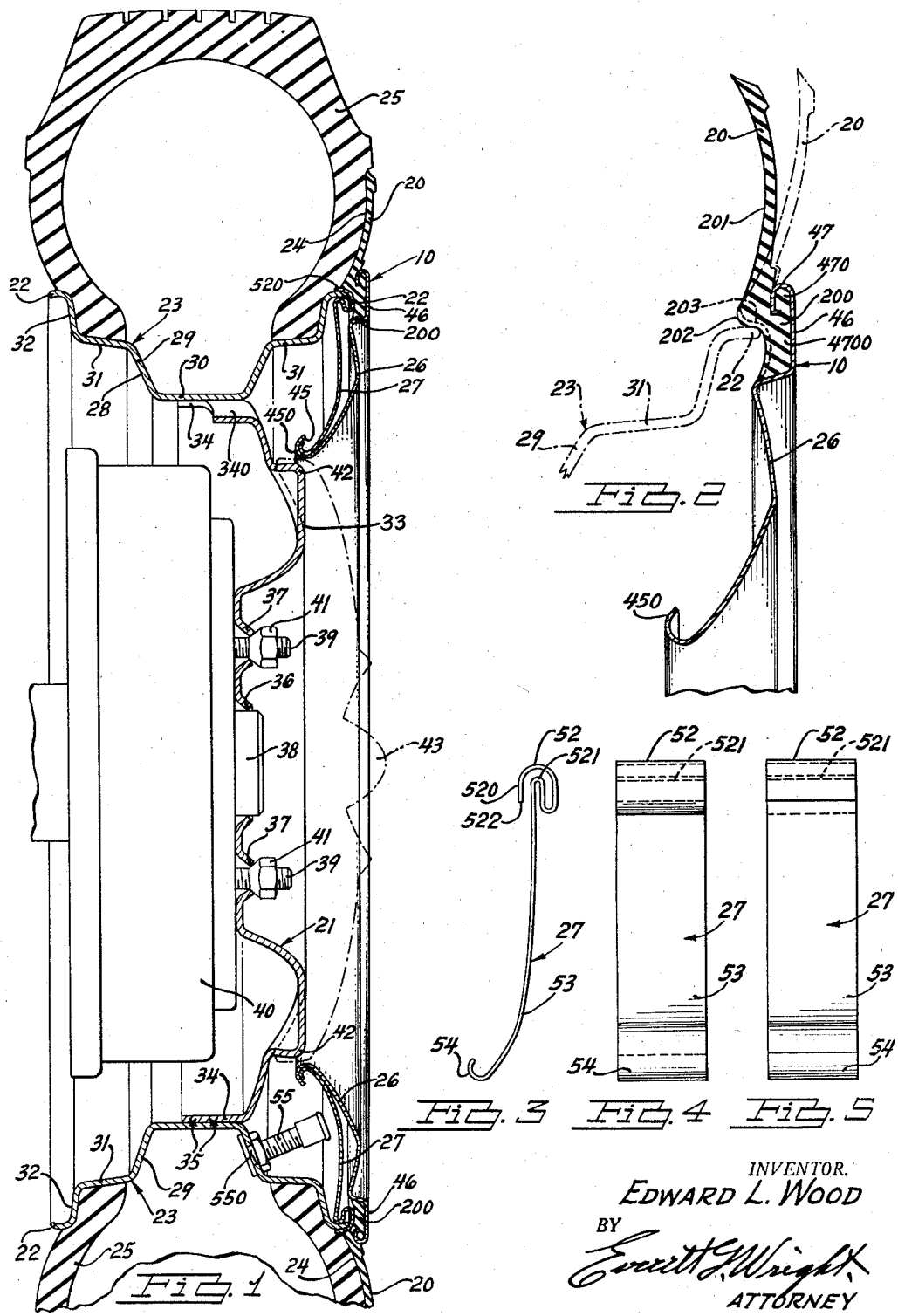

INVENTOR.
EDWARD L. WOOD
BY
*Everett E. Wright*
ATTORNEY

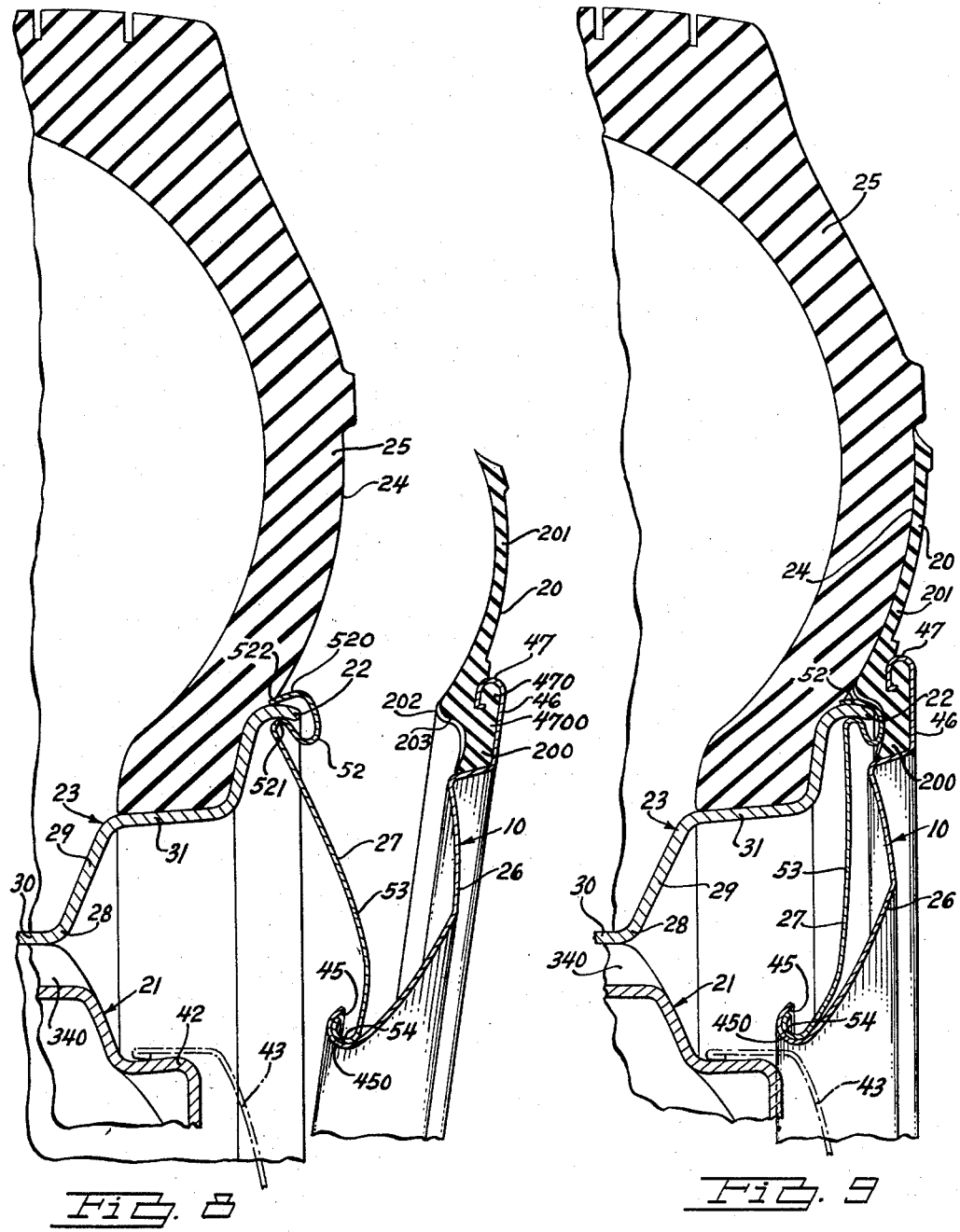

United States Patent Office 2,909,390
Patented Oct. 20, 1959

2,909,390

TIRE TRIM-WHEEL TRIM STRUCTURE

Edward L. Wood, Detroit, Mich., assignor, by mesne assignments, to Gar Wood Industries, Inc., a corporation of Michigan Application May 23, 1956, Serial No. 586,756

3 Claims. (Cl. 301—37)

This invention relates to improvements in tire trim and in particular to means for trimming the walls of vehicle tires.

The primary object of this invention is to provide a simple effective tire trim for the walls of vehicle tires which is carried by wheel trim secured axially onto the vehicle wheel, the said tire trim and wheel trim being a unitary structure securable concentrically in cushioned relationship onto the vehicle wheel and over the wall of the tire thereon by means normally employed to secure wheel trim onto a vehicle wheel.

Other objects of the invention will become apparent by reference to the following detailed description taken in connection with the accompanying drawings, in which:

Fig. 1 is a vertical sectional view through a vehicle wheel and tire with unitary tire trim-wheel trim structure embodying the invention mounted thereon and axially fixed concentrically onto the vehicle wheel by suitable securing means.

Fig. 2 is an enlarged sectional view through the unitary tire trim-wheel trim structure embodying the invention.

Figs. 3, 4 and 5 are side, front and rear elevational views of spring clips of a type that may be employed to secure the unitary tire trim-wheel trim structure in axial relationship onto the vehicle wheel.

Fig. 8 is an enlarged cross sectional view showing the unitary tire trim-wheel trim structure engaged by the securing clips ready to be axially urged onto the vehicle wheel.

Figure 6:
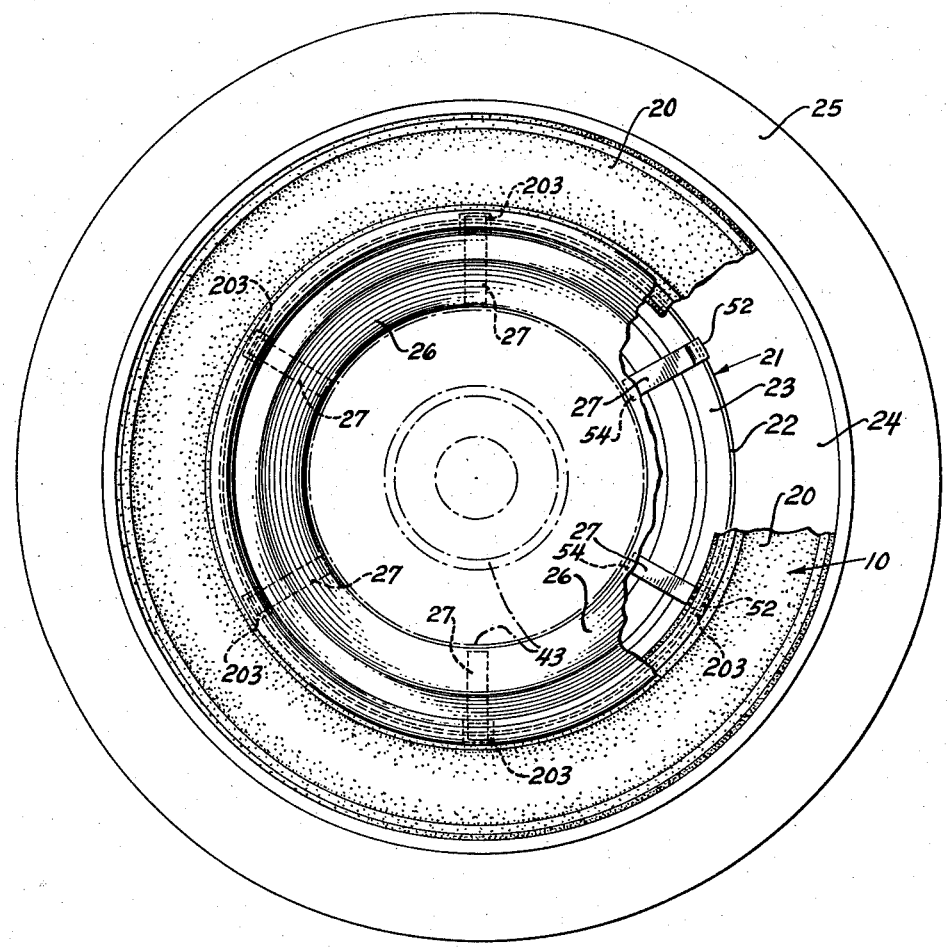
Fig. 6 is an elevational view of the vehicle wheel and the unitary tire trim-wheel trim structure disclosed in Fig. 1 with certain portions broken away to show the particular clip means employed with the illustrative embodiment of the invention to hold the said unitary tire trim-wheel trim structure onto the vehicle wheel.

Fig. 9 is an enlarged cross sectional view similar to Fig. 8 except that the unitary tire trim-wheel trim structure has been moved by the over-center action of wheel trim securing clips into an axial pressure position overlying the lip of the wheel rim, the said tire trim-wheel trim structure maintaining itself concentric with respect to the vehicle wheel with the tire trim held firmly against the wall of the tire thereon.

Referring now to the drawings wherein like numerals refer to like and corresponding parts throughout the several views, the particular construction disclosed for the purpose of illustrating the invention consists of a unitary tire trim-wheel trim structure 10 comprising a tire trim ring 20 of rubber or other resilient material formed preferably as shown in Fig. 3 having an inner annular bead portion 200 and an outer arcuately formed annular wall portion 201, and metallic wheel trim such as a wheel trim ring 26 secured to the vehicle wheel 21 by suitable wheel trim securing means 27, the said tire trim 20 being vulcanized or cemented to and/or interlocked with the outer peripheral portion of the wheel trim 26 to form, in essence, a unitary structure. The said bead portion 200 of the tire trim ring 20 is preferably provided with an inwardly facing annular rib 202 which overlies the lip 22 of the rim 23 of a vehicle wheel 21 when the tire trim-wheel trim structure 10 is axially positioned thereover, the said annular rib 202 is preferably formed to contact both the axial outer annular end and the outer periphery of the wheel rim lip 22 when the said tire trim-wheel trim structure 10 is axially urged onto the vehicle wheel 21 over the lip 22 of the rim 23 thereof. The outer annular wall portion 201 of the tire trim ring 20 is arcuately formed to flex firmly against the side wall 24 of the tire 25 mounted on the vehicle wheel 21 when the said tire trim-wheel trim structure 10 is axially fixed onto the vehicle wheel 21. Suitable pockets 203 are molded into the inner periphery of the annular bead portion 200 of the annular tire trim ring 20 at intervals therearound to accommodate the spring clips 27 employed to hold the tire trim-wheel trim structure 10 onto the vehicle wheel 21, thus permitting the said bead portion 200 of the tire trim ring 20 to uniformly contact the outer annular end and the outer periphery of the lip 22 of the rim 23 of the vehicle wheel 21 except at the locations of the said spring clips 27 which are engaged onto the lip of the wheel rim as hereinafter described in detail.

While the particular wheel trim 26 is disclosed herein in the form of a wheel ring, it is obvious that other forms of wheel trim such as full wheel covers, wire wheel simulating wheel trim and the like may be used in combination with tire trim rings to constitute unitary tire trim-wheel trim structures embodying the invention, provided the wheel trim has an annular portion which extends over the lip of the wheel trim and provided the wheel trim portion is capable of being axially secured concentrically onto a vehicle wheel. Obviously, securing means other than the over-center type spring clips 27 may be employed if suitable axial pressure or holding of the tire trim-wheel trim structure 10 against the lip 22 of the wheel rim 23 is maintained by the securing means when the tire trim-wheel trim structure 10 is fixed thereby onto the vehicle wheel 21.

A typical vehicle wheel 21 of the type that may have tire trim-wheel trim structure 10 embodying the invention applied thereto is shown in Figs. 1 and 6, the said wheel 21 being shown with a tubeless tire 25 thereon. The said vehicle wheel 21 has a drop center rim 23 composed of a central channel or drop center 28 having side walls 29 and a base 30. A tire bead seat 31 extends laterally outwardly from each of the channel side walls 29 and has a flange 32 extending upwardly therefrom which is curved at its upper portion to terminate in an axially disposed outer lip 22. Within the center of the drop center rim 23 is a spider 33 having an axially disposed flange 34 which generally is secured to the central channel 28 of the drop center rim 23 by such means as welding at 35. The spider 33 is provided with a hub aperture 36 and securing stud holes 37 to accommodate respectively the wheel hub 38 and studs 39 extending from the brake drum 30 to which the wheel 21 is secured by means of the usual wheel securing nuts 41. The flange 34 of the spider 33 is generally scalloped out and formed at 340 at intervals around the periphery thereof to provide added structural strength to the vehicle wheel 21. The spider 33 is preferably provided with a plurality of hub cap retainer nubs 42 over which a hub cap indicated by the dot and dash lines 43 is sprung for securement onto the vehicle wheel 21.

Figure 7:
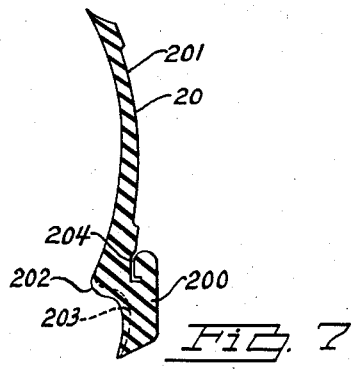
Fig. 7 is an enlarged sectional view similar to Fig. 2 showing a preferred shape of the tire trim if molded separately and subsequently interlocked with and/or cemented to the wheel trim.

The wheel trim 26 forming a part of the tire trim-wheel trim structure 10 is shown for illustrative purposes as an annular ring having an inner annular groove 45 formed therein providing an inner annular rolled edge 450. The outer portion of the annular wheel trim ring 26 is offset at 46 and is preferably curled over and flanged at its outer periphery as indicated by the numeral 47 to provide an annular recess 470 and a radially inwardly disposed circumferential pocket 4700 to receive the inner annular bead portion 200 of the tire trim ring 20. The said annular bead portion 200 of the tire trim ring 20 may be molded into the annular recess 470 of the wheel trim 26; however, if the tire trim 26 is molded separately as indicated in Fig. 7, the annular bead portion 200 thereof is molded to fit into the annular recess 470 of the wheel trim 26 and is provided with a suitable annular groove 204 therein to receive in interlocked relationship the inwardly curled outer flange 47 of the wheel trim 26, and the tire trim ring 20 may be cemented in such interlocked relationship to the wheel trim 26 where it makes contact therewith.

The spring clips 27 preferably employed to secure the tire trim-wheel trim structure 10 onto the vehicle wheel 21 are formed of strip spring steel to provide a reversedly bent and looped head 42 and a curved arm 53 having a wheel trim engaging loop 54 at the outer (radially inwardly disposed) end thereof. The spring clips 27, preferably five or six of them, are sprung tightly onto the lip 22 of the flange 32 of the wheel rim 23 with the transverse edge of the free leg 520 of the looped head 52 thereof disposed in substantial abutment with the bead 250 of the tire 25 mounted on the drop center rim 23 in the manner required according to the type of tire used. The particular tire 25 illustrated is a modern tubeless tire. A valve stem 55 extends through the valve stem aperture 550 provided in the drop center rim channel 28. When the spring clips 27 are properly positioned on the lip 22 of the flange 32 of the wheel rim 23, the outer free leg 520 of the looped head 52 of the spring clips 27 and the inner reversedly bent portion 521 thereof grip opposite sides of the said lip 22 of the wheel rim flange 32 inwardly from the outer edge thereof.

The reversedly bent and looped head 52 of the spring clip 27 distorts when the spring clips 27 are flexed over-center when urged outwardly from their position shown in Figs. 1 and 9 to release the tire trim-wheel trim structure 10 from its normal position on the vehicle wheel to which it is axially urged by the said spring clips 27. The outer free leg 520 of the looped head 52 of the spring clip 27 and the reversedly bent portion 521 thereof normally grip the lip 22 of the rim 23 inwardly of the outer end thereof as shown in Fig. 9, and, when the spring clip 27 is flexed over-center, the edge 522 of the outer free leg 520 remains against the top of the lip of the rim while the reversedly bent portion 521 thereof pivots and rolls against the bottom of the lip 22 of the said rim 23. When the wheel trim 26 of the tire trim-wheel trim structure 10 is not engaged by the wheel trim engaging loop 54 of the spring clips 27, the arms 53 of the said spring clips 27 are disposed inwardly toward the drop center 28 and the spider 33 of the wheel 21. This is the "unloaded" position of the spring clips 27.

To secure the tire trim-wheel trim structure 10 to the vehicle wheel 21, the wheel trim engaging loop 54 at the free end of the curved arm 53 of each of the spring clips 27 is flexed outwardly from its unloaded position hereinabove described, and the wheel trim engaging loop 54 of each said spring clip 27 is engaged in the inner annular groove 45 of the wheel trim 26. The arms 53 of the spring clips 27 are sufficiently long that, when all or substantially all of them have their wheel trim engaging loop 54 engaged in the inner annular groove 45 of the wheel trim 26, the said spring clips 27 have an over-center action and will either hold the tire trim-wheel trim structure 10 outwardly in axial spaced relationship from the wheel rim 23 as shown in Fig. 8, or, if the tire trim-wheel trim structure 10 is manually pushed toward the vehicle wheel 21 until an over-center action of the spring clips 27 in the opposite direction takes place, the said spring clips 27 will take over and constantly urge the tire trim-wheel trim structure 10 with considerable force axially toward and onto the wheel 21 and over the lip 22 of the rim 23, see Fig. 9. In such position and under such constant urging, the annular rib 202 and the inner annular bead portion 200 of the tire trim ring 20 cooperate with the annular edge and the outer periphery of the lip 22 of the vehicle wheel 21 to maintain the said tire trim-wheel trim structure 10 firmly and concentrically thereon with the outer arcuately formed annular wall portion 201 of the tire trim ring 20 flexed tightly against the side wall 24 of the tire 25.

Although but a single embodiment of the invention has been disclosed herein, it is obvious that many changes may be made in the size, shape, arrangement and detail of the various elements of the invention without departing from the spirit and scope thereof as defined by the appended claims.

I claim:

1. In a tire trim-wheel trim structure for a vehicle wheel having a tire mounted thereon, an outer annular resilient non-metallic tire trim element and an inner annular metallic wheel trim element hooked together at their radially inner and outer peripheries respectively, the said structure including a resilient annular bead portion located and formed to permit ready positioning of the tire trim-wheel trim structure onto the vehicle wheel concentrically onto the annular edge of the lip of the rim thereof, the said bead portion having a circumferential radially outwardly facing slot therein, the said wheel trim element including a circumferential radially and axially inwardly disposed flange positioned in said slot in said bead portion, and means associated with said wheel trim element for securing the said tire trim-wheel trim structure axially onto said vehicle wheel whereby to cause said tire trim to lie firmly against the wall of the vehicle tire.

2. In a tire trim-wheel trim structure for a vehicle wheel having a tire mounted thereon, an outer annular resilient non-metallic tire trim element including an annular bead portion and a wall portion of an arcuate cross sectional curvature greater than the curvature of the outer wall of said tire and an inner annular metallic wheel trim element, the said tire trim element and said wheel trim element being provided with interlocking annular formations securing them together against parting under centrifugal force at their radially inner and outer peripheries respectively, the said outer periphery of said wheel trim element being axially inwardly curled and radially inwardly flanged to engage the radial outer periphery of said annular bead portion of said tire trim, the annular bead of said tire trim element being located for positioning over the annular edge of the lip of the rim of the vehicle wheel and having an annular rib thereon adapted to overlie the outer periphery of the said rim lip, and means associated with said wheel trim element for securing the said tire trim-wheel trim structure axially onto said vehicle wheel whereby to cause the arcuate wall portion of the tire trim element to flex into a firm engagement with the outer wall of said tire.

3. In a tire trim-wheel trim structure for a vehicle wheel having a tire mounted thereon, an outer annular resilient non-metallic tire trim element including a wall of arcuate cross section and an annular axially outwardly extending bead at the radial inner periphery thereof, said bead having a radially outwardly facing peripheral slot therearound adjacent the arcuate wall of said tire trim, an annular metallic wheel trim element including an axially rearwardly curled formation at the outer periphery thereof terminating in a radially inwardly disposed flange engaging the annular bead of said tire trim element in the said peripheral slot therein securing said tire trim concentrically onto said wheel trim whereby to positively prevent parting of said tire trim element from said wheel trim element under centrifugal force, and means associated with said wheel trim element for securing said tire trim-wheel trim structure axially onto said vehicle wheel causing said arcuate wall of said tire trim to flex against said tire.

References Cited in the file of this patent

UNITED STATES PATENTS

| | | |
|---|---|---|
| 1,743,074 | Roth | Jan. 7, 1930 |
| 1,968,076 | Goodyear et al. | July 31, 1934 |

FOREIGN PATENTS

| | | |
|---|---|---|
| 1,061,278 | France | Nov. 25, 1953 |